Dec. 9, 1969

K. G. SCHROEDER 3,483,563

COMBINATION VERTICALLY-HORIZONTALLY
POLARIZED PARACYLINDER ANTENNAS

Filed Oct. 13, 1965

D = 12"
F = 2"
d = 6"
h = 1" (REFLECTOR HEIGHT)
H = $\frac{13"}{32}$ (ELEMENT HEIGHT = $\frac{\lambda}{4}$)

INVENTOR.
KLAUS G. SCHROEDER
BY
*Moody and Kintzinger*
ATTORNEYS

INVENTOR.
KLAUS G. SCHROEDER

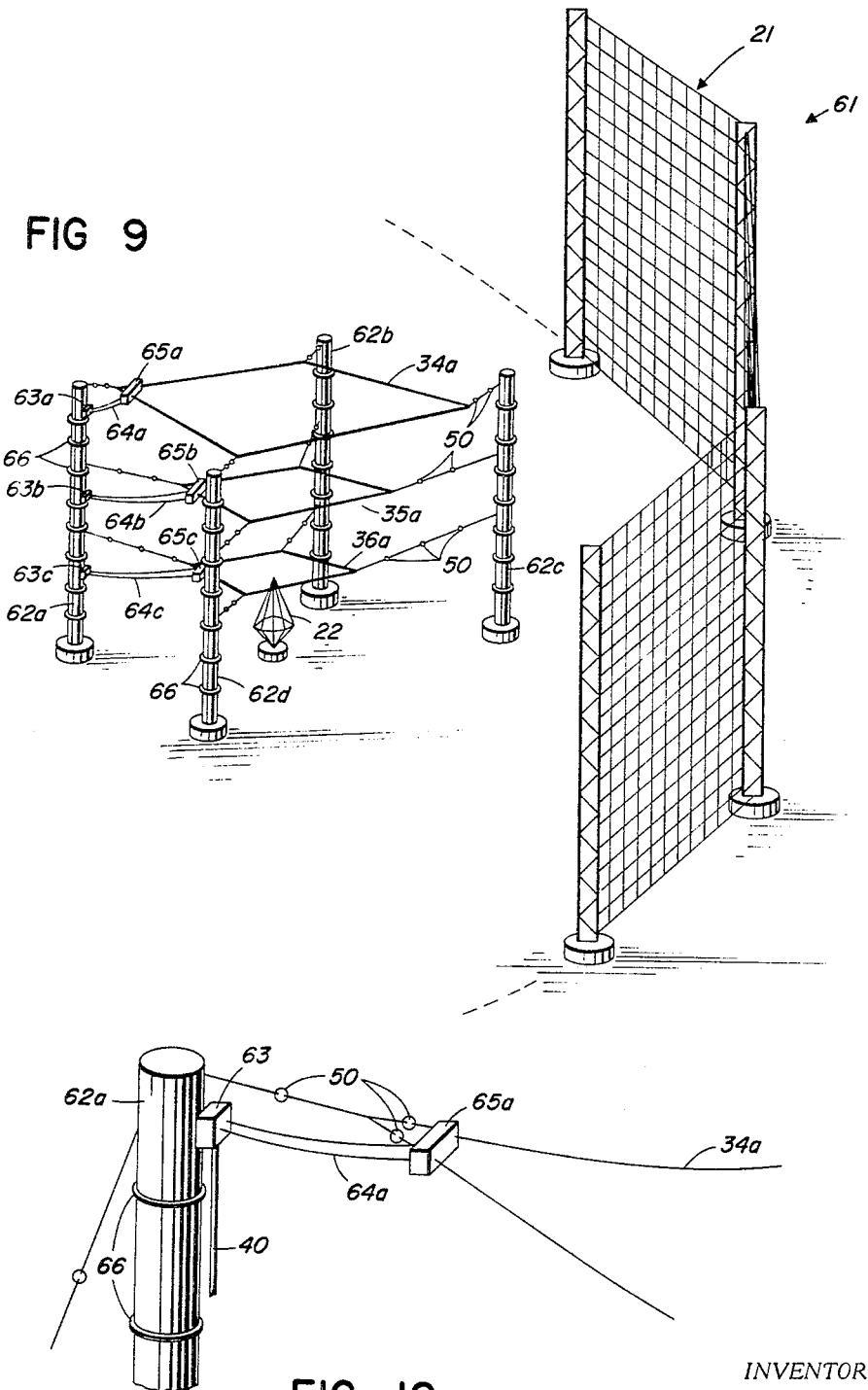

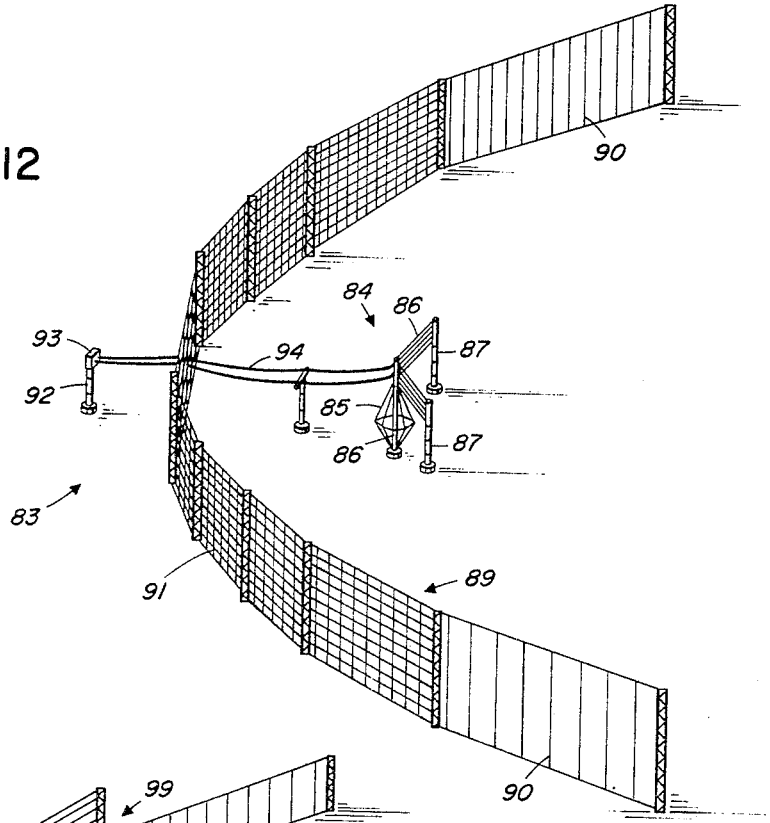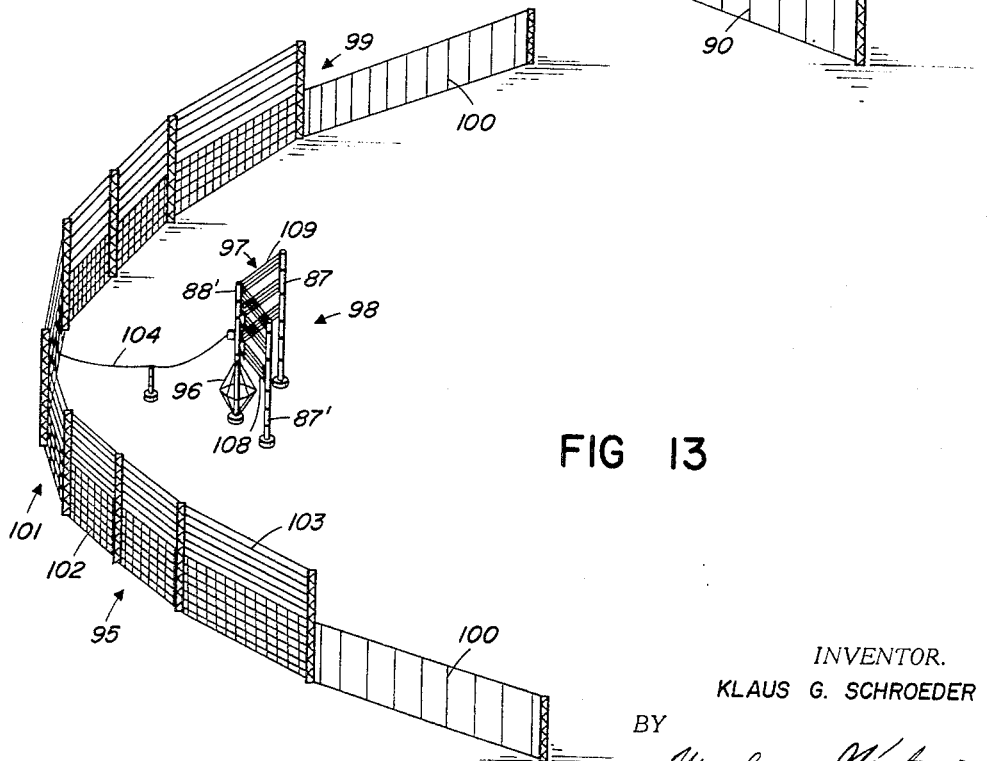

United States Patent Office 3,483,563
Patented Dec. 9, 1969

3,483,563
COMBINATION VERTICALLY-HORIZONTALLY
POLARIZED PARACYLINDER ANTENNAS
Klaus G. Schroeder, Dallas, Tex., assignor to Collins
Radio Company, Cedar Rapids, Iowa, a corporation of
Iowa
Filed Oct. 13, 1965, Ser. No. 495,380
Int. Cl. H01q *21/00*
U.S. Cl. 343—728                                     7 Claims

ABSTRACT OF THE DISCLOSURE

A combination vertically and horizontally polarized fed paracylinder antenna with a focusing reflector having a focal point line forward from the center portion of the reflector and having two radiating structures with effective operational center locations substantially on the focal point line, with the reflector mounted on and extending vertically above a ground plane, and the two radiating structures mounted above the ground plane with one higher than the other.

Figure 1:
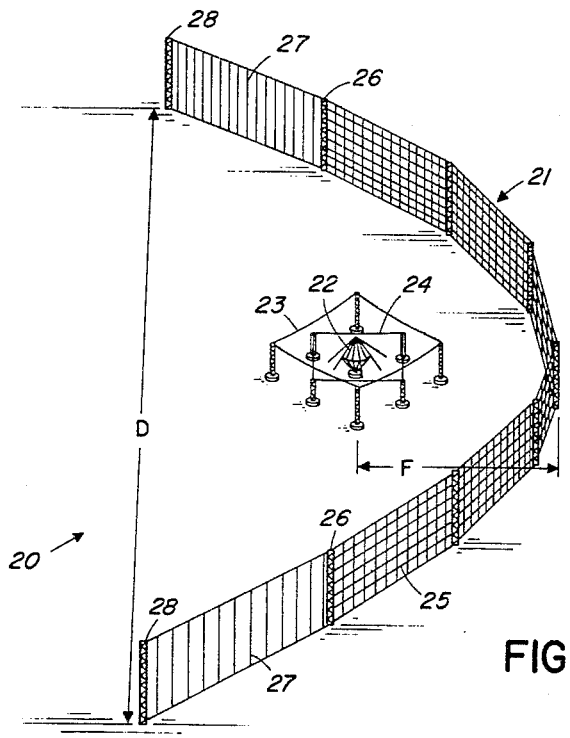

This invention relates in general to various paracylinder antennas, and, in particular, to combination vertically and horizontally polarized fed paracylinder HF and VHF range antennas, and with the antenna feed arrays at relatively short focal distances F as related to paracylinder aperture width D giving a relatively low $F/D$ ratio approximating 0.16.

Various existing parabolic cylinder antennas are generally equipped with reflectors extending to over an operational frequency wavelength in height, and have operational frequency bandwidths relatively narrowly limited by predetermined structural design limitations. The operational frequency range limitations of various of these existing antennas has been such as to not provide efficient practical extended range operation through much of the HF range and up into the VHF range of frequencies. Further, and quite obviously, many of the existing paracylinder antenna arrays are very expensive with the extremely high and long reflector structures required.

Another factor is that of polarization with, for example, a vertically polarized feed providing substantially uniform reflector illumination in the axial dimension of an antenna paracylinder reflector, a factor easily achieved using, for example, a vertical monopole. Further, with, on the other hand, horizontally polarized feed, a problem is presented in that a null state characteristics is developed at zero elevation by interference between the feed and its image just as is the case with many horizontally polarized antennas above a conduction plane. However, on the other hand, some advantages of a horizontally polarized approach are that, no ground plane is required for operation in the HF range and up through the VHF range, and that the feed pattern may be more easily modified to suit the illumination requirements of a particular paracylinder antenna reflector configuration. Thus, use of horizontal polarization can result in a significant improvement in the overall performance of a paracylinder antenna in applications requiring narrow to moderate bandwidth, such as receiving and transmitting antennas in ionospheric scatter systems operating approximately in the range of 40 to 50 mc., and for ionospheric reflection systems requiring up to a 3:1 bandwidth in the HF region.

It should be noted that the horizontal component of man-made noise is naturaly attenuated much more completely than the vertical component with a natural result that horizontally polarized antennas located near strong local noise sources such as industrial centers show considerably better signal-to-noise ratios than vertically polarized antennas of equal gain located at the same site. However, above 10 mc. atmospheric and man-made noise levels are approximately the same and vertical polarization can be used to good advantage since it provides required low radiation propagation take-off angles at such frequencies. Hence, it appears that if substantially the entire HF band and possibly up into VHF is to be included as an operational bandwidth in a practical antenna that this may be advantageously accomplished by a combination vertical and horizontally polarized paracylinder antenna array, according to applicant's teachings. It may be such an antenna using a vertical broadband conical monopole giving vertical polarization particularly effective for the frequency range, for example, 10 mc. to 30 mc. and perhaps some higher, and, for example, two horizontal loops for horizontal polarization in frequencies of, for one loop, from 2.5 mc. to 5 mc., and the other loop from 5 mc. to 10 mc. Other problems of existing paracylinder antenna arrays utilizing a single polarization feed include what is known as polarization fading, and with some, azimuth spillover losses.

It is, therefore, a principle object of this invention to provide improved paracylinder antenna systems with a combined vertically and horizontally polarized feed operational at various frequencies through high frequency and in some instances up into the VHF range.

Another object is to provide a combination vertically and horizontally polarized paracylinder antenna with gain optimized by a relatively low focal distance-to-paracylinder aperture width ratio.

A further object is to provide such transmitting and receiving paracylinder antennas with polarization fading minimized, azimuth spill-over losses minimized, ground radial problems minimized, noise interference problems minimized, and with relatively low side lobes in the forward direction as compared to solely omnidirectional fed antennas, and with antenna gain variation with frequency change minimized.

Features of this invention useful in accomplishing the above objects include, in the various embodiments, combination vertically and horizontally polarized fed paracylinder antenna configurations particularly useful in HF and possibly up into the VHF ranges with the antenna feed arrays at a relatively short focal distance F as determined by the paracylinder shape and with aperture width D giving a relatively low $F/D$ ratio approximating 0.16. Further, the paracylinder height with the bulk of these embodiments generally falls in the range of from 0.4λ to 1λ with most being advantageously under a wavelength in height. Further, through various operational frequency ranges, particularly in the transmitting mode of operation, feed may be switched between the vertically polarized feed element array and the horizontally polarized feed array or both switched for simultaneous feed, a condition more generally utilized in the receive mode of operation with various paracylinder antenna embodiments set forth herein.

Specific embodiments representing what is presently regarded as the best mode of carrying out the invention are illustrated in the accompanying drawings.

Figure 2:
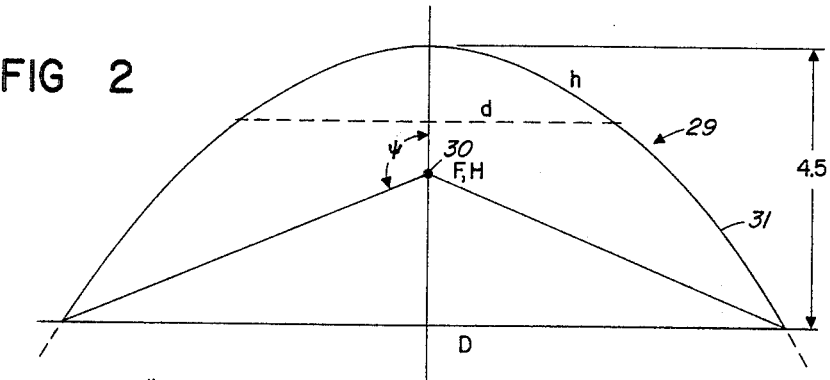
Figure 3:
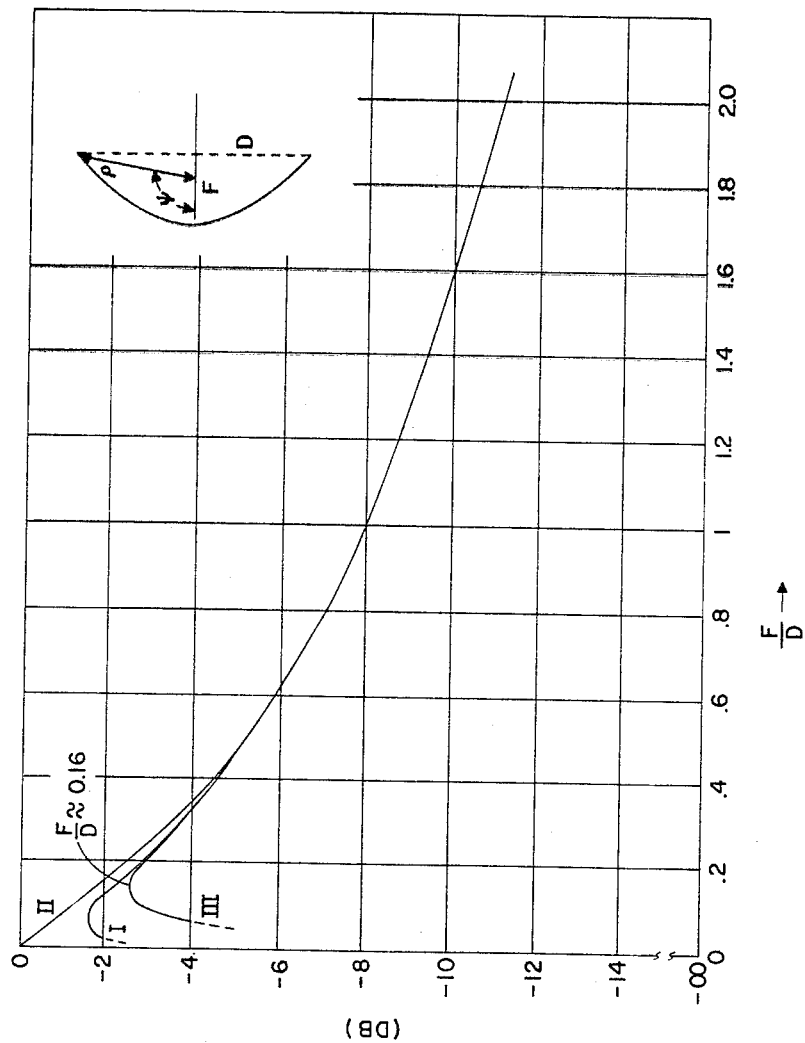
Figure 4:
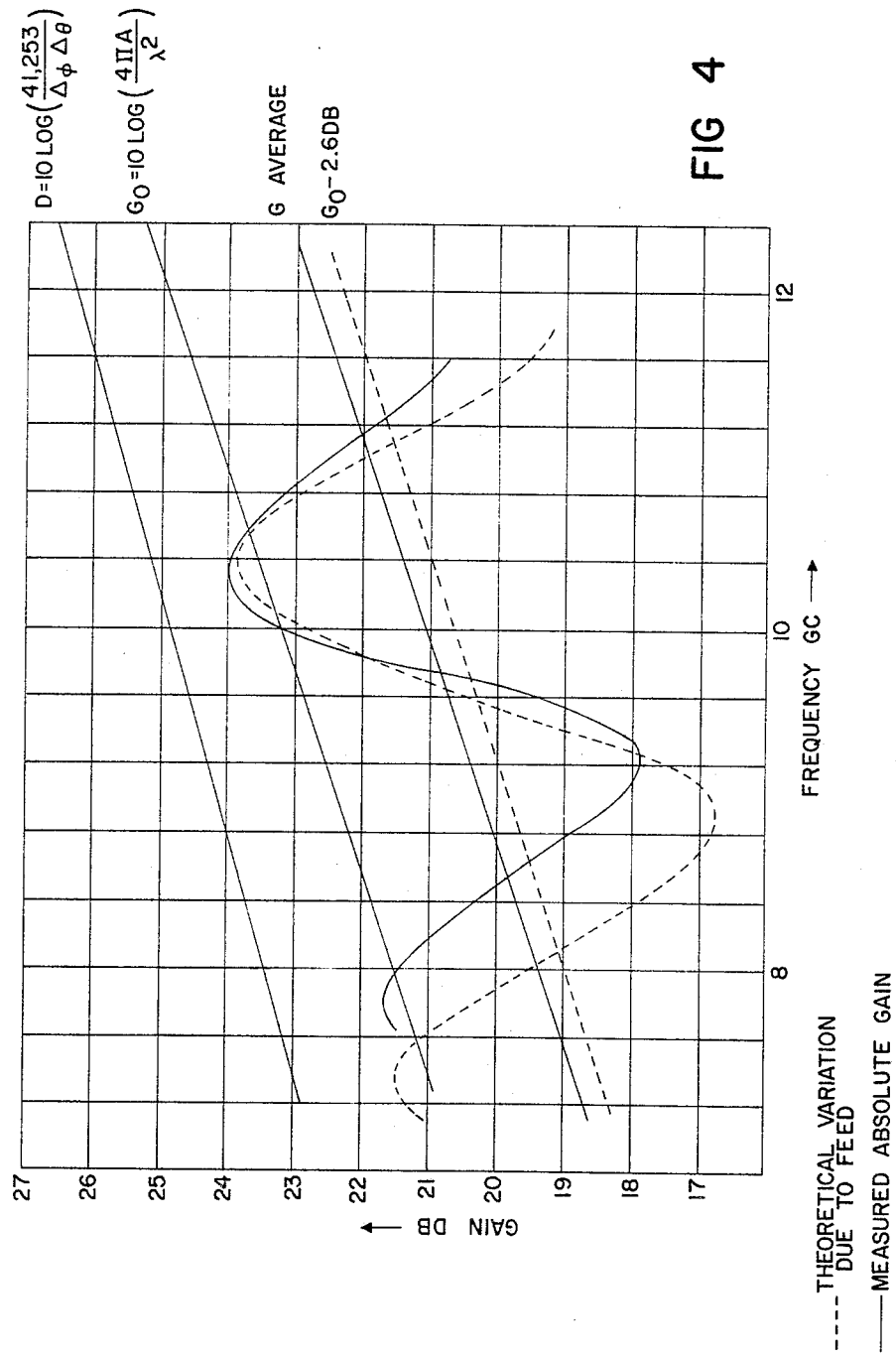
Figure 5:
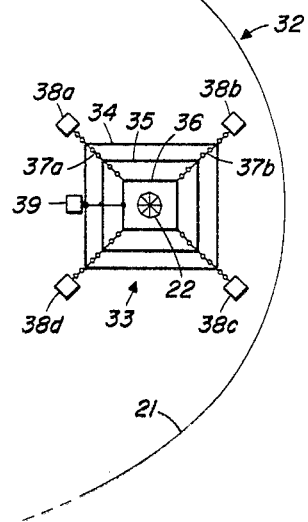
Figure 6:
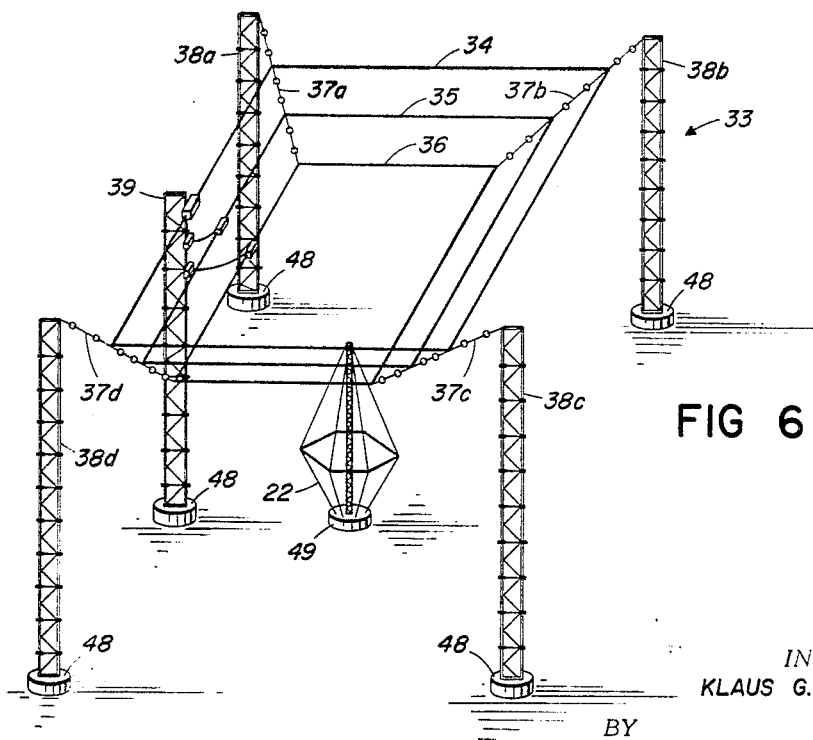
Figure 7:
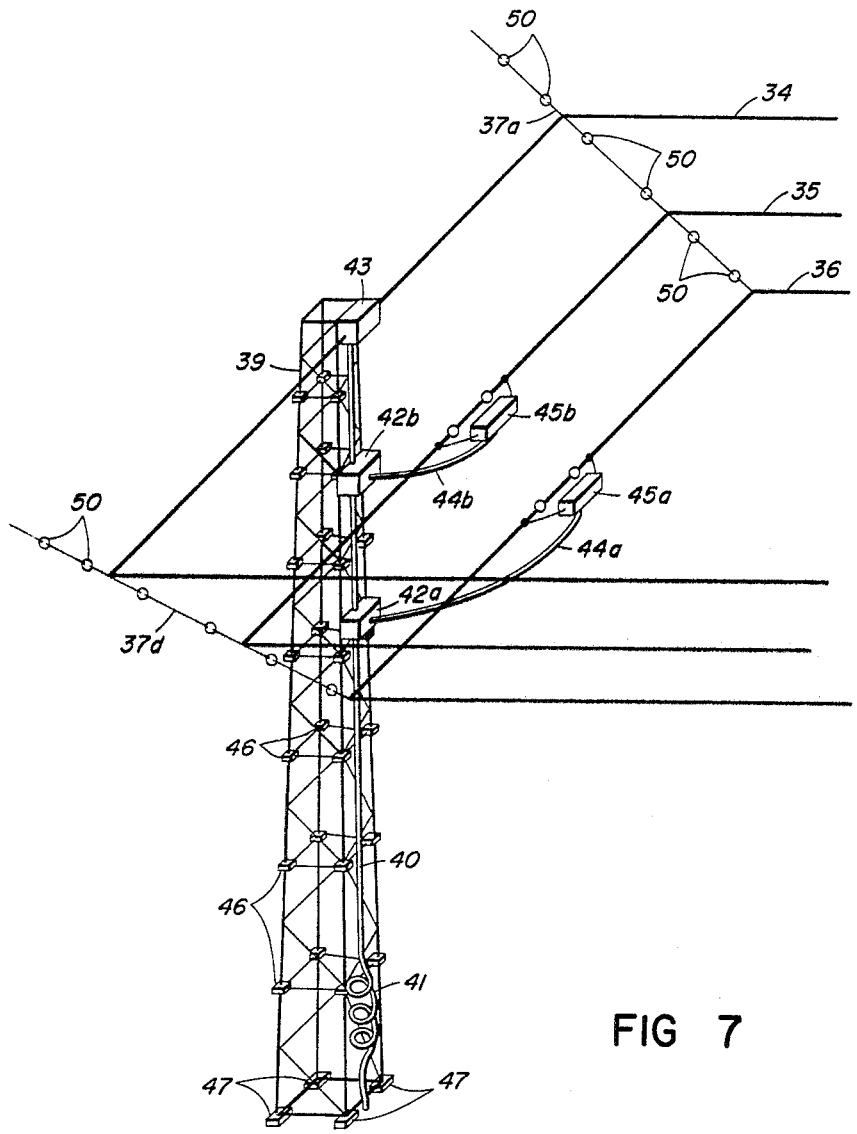
Figure 8:
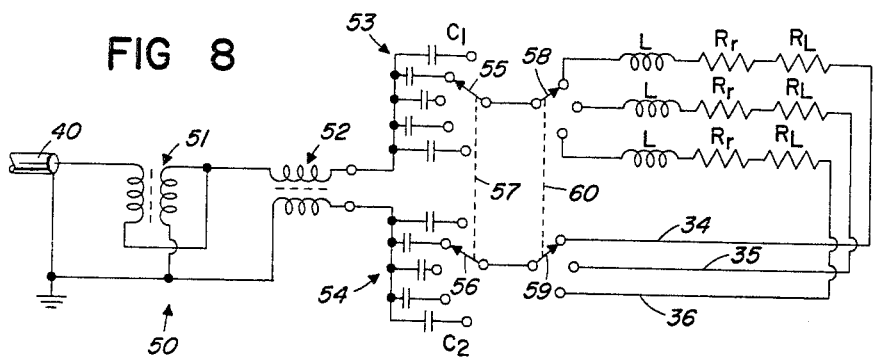
Figure 11:
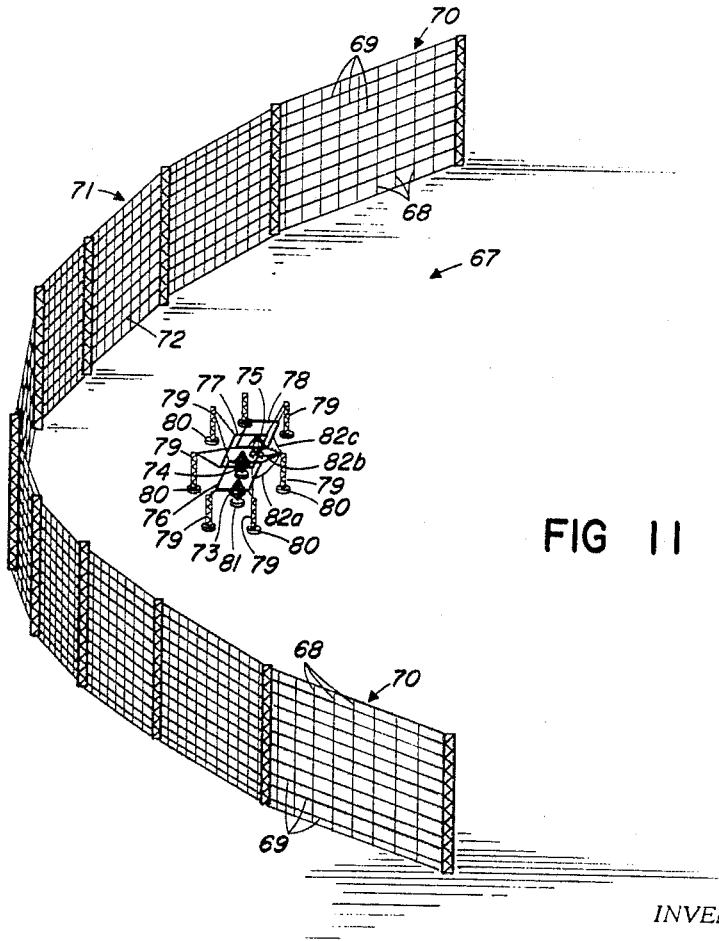
Figure 14:
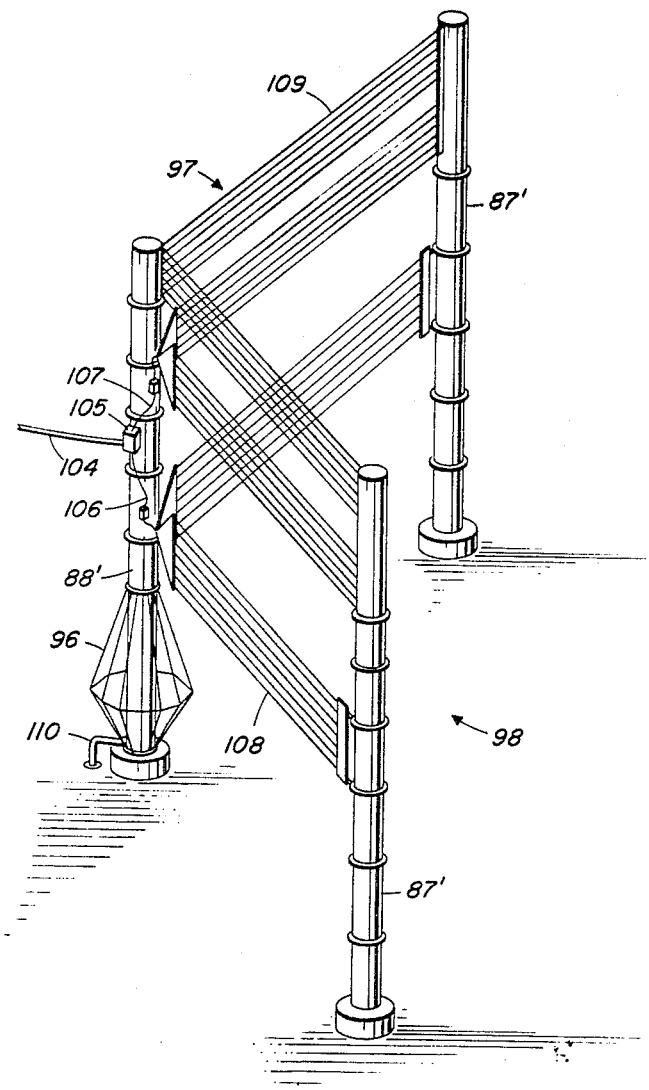

In the drawings:

FIGURE 1, represents a perspective view of a broadband HF range combination vertically and horizontally polarized fed paracylinder antenna;

FIGURE 2, a plan line drawing of a paracylinder antenna dimension layout;

FIGURE 3, a graph of theoretical azimuth gain in db as a function of paracylinder $F/D$ ratio as determined according to three different formulas set forth hereinafter;

FIGURE 4, a graph of theoretical and measured gain with operational frequency variation for a paracylinder antenna;

FIGURE 5, a plan view of an HF range combination vertically and horizontally polarized fed paracylinder antenna;

FIGURE 6, a perspective view of the combined vertical monopole and horizontally polarized multi-loop feed for the antenna of FIGURE 5;

FIGURE 7, a perspective view of a feed tower and feedline detail for the horizontally polarized multi-loop feed of the antenna of FIGURE 5 and feed array of FIGURE 6;

FIGURE 8, a feed circuit schematic showing a transformer and balun matching system with a switchable capacitor signal feed through link and loop switch connective system;

FIGURE 9, a perspective view of another HF range combination vertically and horizontally polarized fed paracylinder antenna with the horizontally polarized feed loops rotated 90 degrees from those of the embodiment of FIGURE 5 to a diagonal orientation;

FIGURE 10, a perspective of loop feed detail for the paracylinder antenna embodiment of FIGURE 9;

FIGURE 11, another HF range combination vertically and horizontally polarized fed paracylinder antenna equipped, however, with azimuth beam steering with three alternately activated vertical element and loop feed systems located at approximately a focal distance from the reflector, one operational feed system effectively on a ground radial through the focal point of the paracylinder antenna, and the other two displaced to opposite sides for azimuth beam steering by controlled operational switching between the feed systems;

FIGURE 12, a perspective view of another combination vertically and horizontally polarized array fed paracylinder antenna;

FIGURE 13, a perspective view of still another combination vertically and horizontally polarized array fed paracylinder antenna using a complementary dipole pair element group for horizontally polarized feed; and FIGURE 14, an enlarged perspective view showing feed array detail of the feed system used with the antenna of FIGURE 13.

Referring to the drawings:

A broadband HF range combination vertically and horizontally polarized fed paracylinder antenna 20 of FIGURE 1 is shown to have a paracylinder reflector 21, a broadband conical monopole 22, mounted to extend vertically above the ground at a focal distance F relative to the paracylinder reflector 21 having an aperture opening width D, for vertical polarization feed, and two loops 23 and 24 for horizontally polarized feed in the antenna array. Aantenna 20 could use a broadband conical monopole for a range of frequency of, for example, from 10 to 30 mc. and the loops 23 and 24 could be proportioned for signal feed in the ranges, for example, of, respectively, from 2.5 mc. to 5 mc., and 5 mc. to 10 mc. With such a combination of feed elements the active feed may be switched from one to another for transmission or, on the other hand, they may all remain connected while in the receive mode of operation. While it is possible to also cover the lower frequencies with one full bandwidth HF monopole, noise considerations make horizontal polarization feeds more effective approximately in the range of 2 mc. to 10 mc., particularly with man-made noise generally exceeding atmospheric noise in that region at many antenna sites and particularly with it being difficult to discriminate against such man-made noise interference in the forward direction where the side lobes are large. It should be noted that the loops 23 and 24 are substantially square loops of wire mounted from towers above the ground plane with the lower frequency loop 23 being mounted with two of its opposite corners along a ground radial axis through the focal point, and with loop 24 a higher frequency smaller loop mounted with two sides of the loop perpendicular to a ground radial through the focal point. Further, both loops 23 and 24 are positioned to have effective operational centers located substantially at the focal point and with the loops in substantially concentric relation to the monopole 22. It should also be noted that the larger lower frequency feed loop 23 is mounted at a higher elevation than the smaller higher frequency loop 24.

In a modification of the antenna embodiment of FIGURE 1 for obtaining operational characteristics varying from those with the structure set forth above in such a cross polarized fed paracylinder antenna the vertical monopole 22 would be, for example, proportioned for approximately the 4 mc. to 12 mc. range and the two loops 23 and 24 are proportioned for the 12 mc. to 18 mc., and the 18 mc. to 27 mc. frequency ranges, respectively. Among the reasons for doing this in arriving at these proportions in this antenna design is that for each single loop, to provide a 1.5:1 frequency range the circumference around the loops falls in a range of from $0.4\lambda$ (wavelength) to $0.6\lambda$, and the input resistance varies from about 5 ohms to about 26 ohms, resulting in a 2:1 to 10:1 VSWR range with respect to 50 ohms over the band. Using two loop feeds at different heights for the horizontally polarized range from 12 mc. to 27 mc. advantageously minimizes maximum beam elevation angle variation with frequency change. The minimum directive gain at 4 mc. with such an antenna configuration would be approximately 20 db with a 1,000 foot D width, 140 foot high reflector 21, and with the azimuth beam width being approximately 15 degrees between the opposite side $-3$ db points. A further feature for this type usage is that the center portion 25 extending between reflector supporting towers 26 at opposite sides of the paracylinder reflector is a rectangular mesh wire screen so as to reflect both vertical and horizontal polarized electromagnetic propagated radiations. The outer portions 27 of the paracylinder extended between reflector support towers 26 and outer aperture ends reflector supporting towers 28 include as reflective elements only vertically depending reflector wires for effectively reflecting lower frequency vertically polarized signals. The back lobe will generally be lower than $-20$ db, and the near-in side lobes in the forward direction (two side lobes left and right of main beam) are approximately $-15$ db. In the two modifications of the FIGURE 1 embodiment and in other various embodiments, the cross-over between feeds can be accomplished by switching, or automatically by multiplexing, in a conventional manner as would be apparent to those skilled in the art.

With such structures as these paracylinder antennas, particularly in the HF and VHF ranges, large structural requirements have been imposed in paracylinder antenna reflectors and in the feed structures therefore of considerable magnitude. If reflectors of relatively low height were to be operationally usable with good output efficiencies attained, particularly if heights can be held under a wavelength, great savings in construction costs are realized. A relatively small paracylinder 29, such as shown in plan view line drawing form in FIGURE 2 and with the measurements indicated, with a monopole 30 feed has been constructed and tested to more thoroughly obtain an understanding and an evaluation of beam forming characteristics of parabolic cylinder reflectors of low height. Among the characteristics of pertinent interest is one with respect to the ratio of focal distance F position of the monopole from the center of the paracylinder reflector 31 to the aperture opening measurement D of the parabolic cylinder reflector, and with respect to operational optimization of this $F/D$ ratio. This also gave indications of side lobe levels, and gain variation with frequency equally applicable to horizontally polarized paracylinders and to combined vertically and horizontally polarized paracylinders. A parabolic cylinder substantially half-reflector antenna above a conducting ground plane, otherwise known as a paracylinder antenna, generally achieves the same gain as a Yagi antenna array with a reflector which is also 4λ wide, but only approximately 0.6λ high, with the Yagi reflector 2λ high.

In the frequency range of the relatively small paracylinder antenna 29 built and tested, maximum operational efficiency was obtained with a vertically polarized feed as opposed to a horizontally polarized feed since vertical polarization is required at the operational frequency levels of antenna 29 for desired propagation considerations. A property of the relatively small paracylinder antenna built is that there was a gain loss resulting from azimuth spill-over due to the omnidirectional feed-pattern. Assuming field distributions are separable, the azimuth gain factor may be written as the ratio of the maximum value of the azimuth gain function $G_m$, to the gain $G_o$ for uniform illumination without spill-over:

$$G = \frac{G_m}{G_o} = \frac{1}{8\pi} \cot \frac{\Psi}{2} \left[ \int_{-\Psi}^{\Psi} \sec \frac{\psi}{2} d\psi \right]^2 \quad (1)$$

where $\Psi$ is the angular aperture of the paracylinder 29 of FIGURE 2. Assuming that uniform illumination is operationally obtained in the direction of the cylinder axis and that the feed is omnidirectional in azimuth, substituting:

$$\int_{-\Psi}^{\Psi} \sec \frac{\psi}{2} d\psi = 2 \int_{-\Psi/2}^{\Psi/2} \sec \theta \, d\theta \quad (2)$$

the following relation is obtained:

$$\int_{-\Psi}^{\Psi} \sec \frac{\psi}{2} d\psi = \ln \left[ \left( \frac{1 + \sin \frac{\Psi}{2}}{1 - \sin \frac{\Psi}{2}} \right)^2 \right] \quad (3)$$

and:

$$G = \frac{1}{8\pi} \cot \frac{\psi}{2} \left\{ \left[ \ln \left( \frac{1 + \sin \frac{\Psi}{2}}{1 - \sin \frac{\Psi}{2}} \right)^2 \right] \right\}^2 \quad (4)$$

further, noting that:

$$\frac{F}{D} = \frac{1 + \cos \Psi}{4 \sin \Psi} = \frac{1}{4} \cot \frac{\Psi}{2} \quad (5)$$

a formula is provided:

$$G = \frac{2}{\pi} \frac{F}{D} \ln^2 \left[ \frac{\sqrt{\left(\frac{4F}{D}\right)^2 + 1} + 1}{\sqrt{\left(\frac{4F}{D}\right)^2 + 1} - 1} \right] \quad (6)$$

where F is the focal length distance and D is the aperture width. Evaluation of the Formula 6 derived immediately hereinabove reveals an increase in gain factor, and consequently in illumination efficiency, for small $F/D$ ratios with a maximum being reached $F/D$ ratio approximately equal to 0.075. Keep in mind that no optimization of the primary feed pattern was required with respect to reflector illumination since the feed was omnidirectional to begin with. For aperture angles $\Psi > 90$ degrees the variation in the distance between feed and reflector will become large enough so that the exact azimuth illumination function becomes important. The gain factor in accordance with Formula 6 is illustrated by curve I in FIGURE 3. This is with the gain factor generating formula having been computed for a long cylinder monopole and it had been therefore assumed that there was illumination taper with increasing distance from the cylinder monopole source to the reflector in accordance with the formula:

$$E = \frac{E_0}{\sqrt{\rho}} \quad (7)$$

This illumination gain reduction factor with increasing illumination angles is small. It is about 0.1 db for $\Psi = 90$ degrees ($F/D = 0.25$) and about 0.5 db for $\Psi = 136.4$ degrees ($F/D = 0.1$), a factor illustrated by curve II of FIGURE 3. Curve II shows the ratio of illuminated angle range in azimuth to a $2\pi$ radian total, or:

$$G_{II} = \frac{\Psi}{\pi} \quad (8)$$

In the case of the paracylinder antenna, however, a more accurate evaluation of the illumination taper factor is given by the formula:

$$E = \frac{E_0}{\rho} \quad (9)$$

because the monopole feed will behave more like a point source. With the gain factor computed with the illumination taper factor of Formula 9 still assuming omidirectivity in azimuth and uniform illumination in elevation, the azimuth gain factor may be computed by the following formulas:

$$G_{III} = \frac{1}{2\pi} \frac{\left[ \int_{-\Psi}^{\Psi} \sec^2 \frac{\psi}{2} d\psi \right]^2}{\int_{-\Psi}^{\Psi} \sec^4 \frac{\psi}{2} d\psi} \quad (10)$$

which leads to:

$$G_{III} = \frac{2}{\pi} \frac{\tan \frac{\psi}{2}}{1 + \frac{1}{3} \tan^2 \frac{\psi}{2}} \quad (11)$$

For large $F/D$ ratios this gain factor as illustrated by curve III in FIGURE 3 approaches curve II and also curve I. It appears that the maximum gain factor value is reached for a $F/D$ ratio approximately in the area of 0.16 but that this maximum value is fairly broad so that deviations from this ratio value to, for example, from a 0.1 to 0.2 $F/D$ ratio range will have only a small effect on the gain factor. Smaller $F/D$ ratios will result in lower azimuth side lobe levels, while at the same time a larger azimuth range is shielded by the reflector, causing the side lobe levels to drop as the feed moves into the reflector shadow zone.

The Equations 1 through 11 set forth hereinbefore are concerned with reflector gain and azimuth only and are derived with the assumption that the monopole 30 illuminates the reflector uniformly in elevation while in fact the total antenna gain is determined by the phasor sum of the primary and secondary fields on axis, a factor considered in evaluating test results obtained with the paracylinder antenna 29. With the antenna 29 of FIGURE 2, the lower frequency limit was 7200 mc. and an aperture width D of one foot was used. This is actually a 7.32λ aperture width D at a 7.2 gc. frequency, an antenna configuration and operational frequency theoretically resulting in a 7 degree azimuth beam width for obtaining substantially uniform illumination. A reflector having a height $h$ in antenna 29 of 1 inch was used.

In order to keep azimuth spill-over losses and the focal length within reasonable limits, a $F/D$ ratio of 0.166 was selected with reference to curve III of FIGURE 3 a ratio which translates to a focal length of 2 inches in the antenna 29 of FIGURE 2 and also to a total antenna front-to-back depth of 4.5 inches. Since it is desirable that the beam width and azimuth should remain substantially constant as a function of frequency, the reflector leakage could be controlled by using a vertical wire grid with varying increasing wire spacing toward the ends of the reflector. This would provide for, at the lowest operating frequency, all of the reflector surface being active to the aperture D shown in FIGURE 2 and with, at the highest frequency, approximately about half of the reflector being active and providing an effective aperture $d$ along the dotted line. A main object of the test, however, was to establish usefulness of parabolic cylinder reflectors with heights comparable to a wavelength. The antenna beam of such antennas can be steered in azimuth by mechanically moving the feed formal to the focal line and electrical beam steering may be accomplished by switching between several feeds such as described with respect to other embodiments hereinafter described.

With the embodiment 29 of FIGURE 2, a λ/4 radiator consisting of a type N feed-through connector was used with a short brass rod extended to a resonant length of 7.2 gc. at which frequency the standing wave ratio of the radiator input was about 1.2. Gain comparison under matched conditions was also made using a standard gain horn. Actual free-space pattern measurements were made at 8.2 gc. and 12.4 gc. with the antenna mounted on a ground plane extending 23.5 inches out front from the forward edge of the reflector. The antenna was originally designed for a directive gain of ≈22 db at 7.2 gc. assuming 8 degrees azimuth and 30 degrees elevation beamwidth, the latter being expected because of a suspicion that the effective elevation aperture might be smaller than the sum of the projected physical aperture and its image. The measured elevation pattern is almost exactly identical with the pattern calculated from sin $u/u$, with an aperture of 1.39λ, except for a small misalignment of the boresight axis of the measured pattern. For this reflector height the effective aperture is thus identical with the physical aperture, a result which will be further substantiated by the gain comparison. With a boresight correction the elevation beamwidth measured is about 20 degrees. The azimuth beamwidth was determined fairly accurately to be 9 degrees and thereby the directive gain to be approximately 23.6 db. The patterns were also measured at 12.4 gc. and the azimuth beamwidth was found to be 6 degrees, the elevation beamwidth approximately 15 degrees, and the back lobe level —20 db. The azimuth forward sidelobes also decreased from a previous —14.5 db to about —16 db.

The measured azimuth beamwidths can be calculated from the formula:

$$B_\phi = \frac{75}{D_\lambda} \text{ (degrees)} \qquad (12)$$

where $D_\lambda$ is the paracylinder aperture in wavelengths. A theoretical beamwidth formula can be arrived at by plotting the pattern function for the azimuth illumination function equivalent to the illumination taper of the antenna. For the taper of Formula 9 we get an illumination function (for an angular aperture of $\Psi$=112.5 degrees.

$$f(x) = 0.5 + 0.5 \cos\left(\frac{5\pi}{8} x\right) \qquad (13)$$

The pattern is then given by $$\left(\text{with } u = \frac{\pi D}{\lambda} \sin \phi\right)$$

$$F(u) = 0.5 \frac{\sin u}{u} + 0.5 \left( \frac{\sin\left(u - \frac{5\pi}{8}\right)}{u - \frac{5\pi}{8}} + \frac{\sin\left(u + \frac{5\pi}{8}\right)}{u + \frac{5\pi}{8}} \right) \qquad (14)$$

which, when evaluated, shows a beamwidth of about 8 degrees at 8.2 gc. The measured increase in azimuth beamwidth to 9 degrees is caused by the interaction of the feed, and by quadratic phase errors in the illumination function. Due to these disturbances of the scattered field the side lobes in the region not shielded by the reflector are much larger than would be expected from the theoretical illumination function. As soon as the feed has moved into the shadow zone the side lobes drop to about the level indicated by Equation 14. Absolute gain measurements were limited by the impedance match of the monopole feed to approximately the frequency range from 8 gc. to 11 gc. All measurements were limited by available signal generators and were made below 12.4 gc. It should also be mentioned that attenuation and mismatch become fairly large in the coaxial feed system at these frequencies.

Gain data obtained is compared in FIGURE 4 with the top curve showing directivity as calculated from the measured patterns. The maximum absolute gain of the uniformly illuminated total aperture falls about 1.9 db below the directive gain at 8 gc. and about 1.6 db at 12.0 gc. The dashed sinusoidal curve is an assumed gain ripple due to the feed and its image either adding in phase, thus increasing the gain by 3 db, or out of phase which would decrease the gain by 3 db. The maxima for this curve were assumed to fall at frequencies where the distance between the feed and its image is an odd multiple of half a wavelength, the minima where this distance is a multiple of a wavelength and the zero crossings where the distance is an odd multiple of a quarter wavelength. The center line for the assumed gain curve with gain ripple is shown 2.6 db below the maximum absolute gain.

The measured gain (appearing as a sinusoidal solid curve) does not show quite such a large variation and its average value is about half a db above the —2.6 db level as shown in FIGURE 4 for this $F/D$ ratio and $1/\rho$ taper, probably due to the image having a smaller excitation amplitude than the feed itself because of $I^2R$ losses. It is interesting to note that the gain is for some frequencies higher than the value calculated from $4\pi A/\lambda^2$, since the effective aperture of feed contributes to the overall absolute gain. The efficiency with respect to the directive gain finally is seen to vary from about 70% at 7.8 gc. to 25% at 9.2 gc., with the average value being about 40%.

It is of interest also to note the following set forth relation between gain and back lobe levels. The back lobe ($\phi$=180 degrees) maximum occurs at $\theta$=30 degrees, fairly close to the theoretical critical angle given by $$\theta_{\text{crit}} = \arctan \frac{h}{F} \qquad (15)$$

with this being the angle where the feed is completely out of the reflector shadow zone with respect to illumination from the rear. The peak level of —16 db can be calculated from $$P_\text{B} = P_\text{F} - P_\text{M} \text{ (db)} \qquad (16)$$

where $P_\text{B}$=back lobe level in db, $P_\text{F}$=main beam absolute gain, and $P_\text{M}$=monopole absolute gain.

In a test to determine the ultimate lower limit on the reflector height, the reflector of the paracylnider antenna tested was shortened to a 0.5 inch reflector height with all other dimensions emaining unchanged. The test results were quite poor with the reflector apparently failing to focus in either plane, side lobes almost as large as a hardly recognizable main beam, and gain was poor. In low-silhouette installations it appears that reflector height may not be reduced to such a low height without an unacceptatble loss of performance, and that, the lower limit would satisfy the relation $$h \geq \frac{\lambda}{2} \qquad (17)$$

The broadband HF range combination vertically and horizontally fed paracylinder antenna 32 of FIGURE 5 is equipped with a combined monopole and loop feed 33 illustrated in expanded detail in the perspective view of FIGURE 6 and in further loop feed detail in FIGURE 7. The antenna embodiment 32 of FIGURES 5, 6 and 7 is similar in some respects to the monopole and loop fed antenna embodiment of FIGURE 1 and in like manner is constructed to take advantage of various facts and features presented hereinbefore with respect to $F/D$ ratio optimization, and factors of side lobe level and gain variation with frequency as applied also to loop feed along with monopole feed. The fact that some of the same factors and considerations are generally applicable to horizontally polarized loop feed as well as monopole feed makes possible various feed configurations allowing cross polarized operation as with various embodiments set forth herein.

In the antenna embodiment 32, reflector 21, indicated as being a paracylinder reflector in line form in FIGURE 5, could be the same as reflector 21 of the FIGURE 1 embodiment. The broadband conical monopole 22 could be substantially the same as the monopole 22 of the FIGURE 1 embodiment and is located effectively at the focal point of the paracylinder antenna 32 for vertical polarization feed. In this embodiment, however, the multi-loop horizontally polarized feed structure instead of having two loops structurally mounted and arranged as in the antenna 20, of FIGURE 1, utilizes a plurality of loops. Three loops are shown in the embodiment, although there could be more, with effective operational centers located substantially at the same point and coincidental with the focal point of the antenna 32. In this construction the wire loops 34, 35 and 36 of substantially square shape are suspended by loop supporting cable assemblies 37A, 37B, 37C and 37D from antenna feed loop mounting towers 38A, 38B, 38C and 38D. A feed tower 39 is also provided for carrying the feed lines to the center of the outer aperture side of the loops 34, 35 and 36.

Referring also to FIGURE 7 for greater loop 34, 35, 36 and feed tower detail, the coaxial line 40, including a coiled portion 41 toward the base of the tower, extends upwardly to and through coax line junction boxes 42A and 42B to, finally, at the top, a combination feedline junction and loop matching box 43 for the larger lower frequency antenna feed loop 34. Branch coax lines 44A and 44B extend from junction boxes 42A and 42B to loop feed matching boxes 45A and 45B having direct feed connections to the loops 36 and 35, respectively. The feed tower 39 is shown to have individual structural section lengths insulated one from the other by tower section insulators 46 in a manner that would be readily apparent to those skilled in the art. Furthermore, the tower may be mounted on the ground on supporting blocks 47, a system of mounting that may be employed for the loop mounting towers 38A–D, or a larger poured concrete support 48 such as shown in FIGURE 6 may be employed for the mounting towers and the feed tower and a similar poured concrete mount 49 may be provided for monopole 22.

The loop supporting cable assemblies 37A, 37B, 37C and 37D are each provided with multiple wire insulators 50 interspersed between the respective mounting towers and loop 34 and also between each of the loops 34, 35 and 36. In this embodiment, the loops 34, 35 and 36 are mounted by the towers 38A through D and the loop supporting cable assemblies 37A through D mount the loops above the ground plane with two sides of each loop substantially perpendicular to a ground radial through the focal point of the paracylinder antenna. Further, it should be noted that the larger lower frequency loop 34 is mounted at a higher elevation than the next smaller higher frequency loop 35 and that the smallest highest frequency loop 36 is mounted still lower.

In the paracylinder antenna 32 embodiment of FIGURES 5, 6 and 7, the three half wavelength loops 34, 35 and 36 are used since such half wave loops each have a relatively narrow operational bandwidth. It should be noted that in order to reduce high input impedance, two parallel loops of the same length could be installed for each operational bandwidth and with the two parallel loops counter fed. On the other hand, a reactance compensation in subsequent transformation and balancing system could be used or perhaps a combination of both approaches. Actually in the embodiments set forth herein, a multiplicity of single loops is employed having considered a number of factors. In the embodiment of FIGURE 5, the paracylinder reflector 21 has to be high enough to accommodate the angle of maximum radiation for each of the horizontally polarized loop feeds, and also at least $0.4\lambda$ high at the lowest frequency of operation of the vertically polarized feed monopole 22. For example, with a reflector of 1,000 feet and an $F/D$ ratio $\approx 0.16$ selected for maximum gain with an omnidirectional feed pattern, the focal length is 150 feet. This combination of parameters results in, at the low end frequency, $F=3$ mc. of the HF frequency range, in the largest loop 34 when suspended 100 feet above ground (100 feet=$0.3\lambda$ at 3 mc.) having an elevation angle of maximum radiation approximately equal to 55 degrees. This requires a reflector 21 height of $H>150$ tangent 55, i.e., $H>220$ feet. The reflector 21 height required for the minimum frequency ($F=10$ mc.) of vertical polarization, however, is only about $0.4\times100=40$ feet. Since it would be uneconomical to build a reflector to the higher height indicated, the height of the largest loop should be increased to get a lower maximum radiation angle. For example, for a loop height of 150 feet, the radiation angle is reduced to approximately 35 degrees and the reflector height consistent with the selected $F/D$ ratio is approximately equal to $150\times$ the tangnet of 35 degrees, in other words, approximately 105 feet. Of course, there should be reasonable balance between feed loop mounting and feed power requirement expense, desired operational capabilities, and parabolic reflector structural material and erection costs, and with both feed and reflector structures also including maintenance factors. To assure that most of the feed energy illuminates the reflector rather than just the area of the reflector edge, a height $H\approx 160$ feet could be used as a near optimum compromise. Obviously, a higher feed loop position would result in a still lower feed radiation angle than that indicated for the lower height. With a 150 foot high loop a reflector height of 160 feet would insure that most of the horizontally polarized feed energy at 3 mc. would illuminate the reflector in the rearward feed direction and also provides collimation of vertically polarized energy down to approximately the 3 mc. level. In the embodiment shown, the frequency range from 3 mc. to 4.5 mc. is covered by loop 34, 4.5 mc. to 6.75 mc. by loop 35, and 6.75 mc. to 10.1 mc. is covered with loop 36. These are accomplished with loop 34 mounted 150 feet above ground, loop 35, 100 feet above ground and the highest frequency loop 36, 66 feet above ground. Further, the side lengths of these square loops are approximately of a wavelength of the respective operational center frequencies of 3.75, 5.625, and 8.425 mc. which translated equal side lengths of 32.8 feet, 21.9 feet, and 14.6 feet of loops 34, 35 and 36, respectively.

These actual loop lengths are determined by impedance considerations of radiation resistance and efficiency of square feed loops set forth in the following:

For small loops the radiation resistance is given by $$R_r = 31{,}200 \left(\frac{A}{\lambda^2}\right)^2 \qquad (18)$$

Therefore if $A=(\lambda/8)^2$ at the center frequency, $$(R_r)_{\text{center}} = \frac{31{,}200}{64^2} = 7.56\Omega$$

at 3.75 mc., 5.625 mc., 8.425 mc. and so on. At the minimum operating frequency the loop circumference is then $0.4\lambda$, and at the maximum frequency it is $0.6\lambda$, because of the 1.5:1 frequency range. The side lengths are thus $0.1\lambda$ and $0.15\lambda$, and the areas are $0.01\lambda^2$ and $0.0225\lambda^2$. Therefore, $$(R_r)_{\min} = 31{,}200 \times 0.01^2 = 3.1\Omega$$

and $$(R_r)_{\max} = 31{,}200 \times 0.0255^2 = 15.8\Omega$$

In order to increase the radiation resistance to values which, together with the loss resistance, will give about 2:1 VSWR at the minimum and maximum operating frequency, the loop side lengths have to be increased somewhat. By making the side length $l_{min}=0.113\lambda$ at the low end ($l_{max}=0.1695\lambda$ at the high end), the minimum radiation resistance is 5.05 ohms and the maximum radiation is 25.8 ohms. The loop side length $l_0$ at the center frequency is now:

$$l_0 = \left(\frac{0.1130+0.1695}{2}\right)\lambda = \frac{0.2825}{2}\lambda = 0.1412\lambda$$

or:

$$\approx \frac{\lambda}{7}$$

The radiation pattern for this size should be only slightly different than for the originally assumed $\lambda/8$ side length at the center frequency. The loss resistance of such a loop can now be determined. The total loop lengths for the three bands covering: (I) 3 to 4.5, (II) 4.5 to 6.75 and (III) 6.75 to 10 mc. are:

$$(l_{tot})_I = 4l_I = 4.5.2 \text{ meters} = 148.5 \text{ feet}$$

$$(l_{tot})_{II} = 4l_{II} = 30.1 \text{ meters} = 99 \text{ feet}$$

$$(l_{tot})_{III} = 4l_{III} = 20.1 \text{ meters} = 66 \text{ feet}$$

Since $$R_{Loss} = \frac{83.2\sqrt{f}}{d} \times 10^{-9} \times l \qquad (19)$$

with $l$=length in centimeters
$d$=wire diameter in centimeters, the low resistance at 3 mc. for a No. 6 AWG copper wire ($d=0.162''$) is 1.52 ohms, and the loss resistance at 6.75 mc. is 1.06 ohms. The efficiency (exclusive of matching network losses) is thus $$\eta_3 = \frac{5.05}{5.05+1.52} \times 100\% = \frac{5.05}{6.57} = 77\% \text{ at 3 mc.}$$

and $$\eta 6.75 = \frac{5.05}{5.05+1.05} = \frac{5.05}{6.11} = 82.7\% \text{ at 6.75 mc.}$$

It should be noted that the loops 34, 35 and 36 are slightly directional with the direction of maximum radiation being toward the reflector 21 when the feed points are at the far outer apex sides of the loops. Capacitive tuning is generally required substantially at the input of the feed baluns and the coaxial feedlines are coiled as shown at coaxial portion 41 near the ground level to minimize interaction with the vertical feed. A few fixed capacitors may be provided for being selectively switched into the feedline by remote control to optimize feed impedance by compensating the inductive reactance at the various respective operational frequency ranges. The radiation resistance varies from about 5 ohms to approximately 25 ohms within the 1.5:1 frequency range for each loop. The loss resistance for the smallest loop 36 is about 1 ohm at the highest frequency so, obviously, the efficiency of the loop feeds is generally quite high.

Referring to the feed circuit diagram of FIGURE 8 with a three loop 34, 35, and 36 feed embodiment, such as used with the antenna embodiment of FIGURE 5, a 4:1 impedance transformer and balun circuit 50 is used for matching the loops to 50 ohm coaxial feedline with approximately a 2:1 maximum VSWR. A coaxial line 40 is shown connected to and through a 4:1 transformer 51 to the 1:1 balun 52 in the circuit 50 with two terminals of the balun connected to respective capacitor banks 53 and 54. Transformer and balun circuit 50 is effective for matching transforming input impedance of coaxial feedline 40 in the range of 24 ohms to 100 ohms to the range of from approximately 6 ohms to 25 ohms at the terminals into the capacitor banks 53 and 54. Two switches 55 and 56 interconnected by a common drive 57 are simultaneously switched from capacitor to capacitor in the respective capacitor banks 53 and 54 to predetermined desired feed through capacitive values in feed matching through predetermined frequency ranges to the particular feed loop 34, 35 or 36 being used. Switches 58 and 59 having a common interconnecting link 60 for simultaneously switching to connect with desired selected feed loop 34, 35 or 36 are provided for selection of the loop for the desired frequency operational bandwidth range. The loop inductances of the respective loops 34, 35, and 36 is represented by the letter L, the loop radiation resistance $R_r$ and the loop loss resistance by $R_L$ and the $C_1$ and $C_2$ together representing the compensating capacitance value required to series resonate the selected loop 34, 35 or 36.

The vertically polarized feed of vertical monopole 22 can actually be used down to 3 mc. particularly with a 160 foot reflector 21 height. This makes both vertical and horizontally polarized feeds either individually or simultaneously available in the range from 3 mc. to 10 mc. in the paracylinder antenna 32 embodiment of FIGURE 5 presuming of course that a broadband vertical monopole 22 radiator is in fact used. Since broadband monopole 22 has a height greater than 66 feet with the height approximating 81 feet, the lower and smaller high frequency loop 36 has to be higher than the top height of the monopole to avoid feed interference. However, this is no problem because, obviously, from the structure as illustrated in FIGURES 5, 6 and 7 and described with respect thereto there is sufficient room above the 81 foot vertical monopole top height with the three loops being placed, for example, at 150 feet, 120 feet, and 100 feet, respectively. This positioning even leaves room for a fourth loop at a 90 foot height to use an additional range of horizontally polarized feed from 10 mc. to 15 mc. if desired. Furthermore, by placing loops similar to loops 34, 35 and 36 even closer together, practically the entire HF frequency range may be covered by 5 or 6 loops. Since generally in practice, for a large fixed bearing antenna of this nature, only discrete frequencies of operation are required, the discrete frequencies could be pretuned as by appropriate selection of capacitors for the capacitor banks 53 and 54 or by pretuning of tunable capacitors used in these banks, and then simply switch selecting the properly selected and/or tuned capacitors for the predetermined discrete frequency in the frequency range of the loop selected.

For operation in the receive mode this dual polarized paracylinder antenna 32 provides for polarization diversity, if desired, over the entire HF frequency range. For operation in the transmit mode, the horizontally polarized feed may be limited to a predetermined power level as determined by voltage breakdown with the particular capacitors used for tuning. However, if desired, other alternate high power horizontally polarized loop feed circuits may be utilized in place of the specific circuit embodiment of FIG. 8.

With respect to matching network and maximum power capability of loop feeds such as set forth herein, it should be informative to consider the following computations, facts and figures with respect to loop impedance. The total resistance calculations have been set forth hereinbefore in the derivations of Formulas 18 and 19 and the following table lists resistances and inductances.

TABLE I

|  | f (mc.) | $R_r(\Omega)$ | $R_L(\Omega)$ | $R(\Omega)$ | $L(\mu H)$ | $Z(\Omega)$ |
|---|---|---|---|---|---|---|
| Loop I | 3 | 5.05 | 1.52 | 6.57 | 71 | 6.57+j1,340 |
|  | 4.5 | 25.8 | 1.86 | 27.66 |  | 27.66+j2,000 |
| Loop II | 4.5 | 5.05 | 1.29 | 6.34 | 44.8 | 6.34+j1,270 |
|  | 6.75 | 25.8 | 1.58 | 21.38 |  | 27.38+j1,900 |
| Loop III | 6.75 | 5.05 | 1.06 | 6.11 | 28.3 | 6.11+j1,200 |
|  | 10.1 | 25.80 | 1.29 | 27.09 |  | 27.09+j1,795 |

The inductances of the loops are approximately given by $$L = 0.00508 l_{tot} \left( 2.303 \log_{10} \frac{4 l_{tot}}{d} - 2.853 \right) \quad (20)$$

The reactance of the loops is then calculated from $$jX = j2\pi f L \quad (21)$$

The loop capacitance to ground has been neglected in this calculation, but since it is very small no appreciable effect on the overall loop impedance is expected. Also, the loop parallel capacitance, which is approximately given by $$C_{parallel} = \frac{\pi \epsilon}{\log_{10} \frac{l}{d}} \quad (22)$$

can be shown to increase the loop input impedance only slightly. The main problem is thus to series resonate the loops at the selected operating frequencies, and match the resonant total resistance to the 50 ohm coaxial line impedance. Because the series capacitances required to series resonate the loops are rather small, and since the impedance unbalancing has to be achieved after the capacitances, the total series capacitance as calculated from:

$$C_{res} = \frac{1}{2\pi f X_L} \quad (23)$$
$$= \frac{1}{4\pi^2 f^2 L}$$

is doubled and placed between each feed wire end of the loops and the impedance transforming and unbalancing transformer. For loop No. I, we thus get a capacitance value of $2 \times C_{res} = 79.2$ pf. at 3 mc. and $2 \times C_{res} = 35.4$ pf. at 4.5 mc., if we neglect the impedance transformation by the capacitance. Taking the parallel capacitance into consideration, the resonating capacitances are reduced to 62.4 pf. at 3 mc. and 18.4 pf. at 4.5 mc. The parallel capacitance varies relatively little with frequency, so that about the same conditions exist as for the other loops. Because of the increase in input resistance actually shorter loop lengths would be necessary to accomplish less than 2:1 VSWR over the 1.5:1 frequency ranges. This can easily be done, because the radiation efficiency can stand some reduction. The final loop designs will thus have to take all these factors into consideration in order to optimize the performance, but the feasibility has certainly been established.

With reference to power capability of horizontally polarized loop feeds, the limiting factor is obviously the voltage breakdown of the small series capacitances used to tune the loops. At the highest operating frequency calculated so far, i.e., 10 mc., the compensating capacitance is about 10 pf. If we assume a maximum breakdown voltage of 40,000 volts, the maximum power that can be fed into the loop is calculated as follows:

The maximum current which can be sent through $X_c$ is given by $$I_{max} = \frac{40,000}{X_c} \quad (24)$$

For $f = 10$ mc. and $C = 10$ pf. we get $X_c = 1590$ ohms. The maximum current is thus $I_{max} \approx 25$ amperes. The maximum power which can be fed into the total series resistance is now $$N = I_x^2 R_{tot} = 25^2 \times 27 = 17 \text{ kw.}$$

the actual radiated power being somewhat less. For smaller capacitance voltage ratings accordingly smaller power levels can be transmitted.

With the non-uniform current distribution in feed loops approaching a size comparable to a wavelenght, the optimum pattern depends, at least to some extent, on the geometrical configuration and orientation of the feed loops, and further, upon the location of the feed points for the loops. While the square loops 34, 35 and 36 in the embodiment of FIGURE 5 are feed at the center of the loop side opposite the reflector 21 and require a separate feed tower 39, an alternate, diagonally oriented loop feed may be employed as illustrated in the parabolic antenna 61 embodiment illustrated in FIGURES 9 and 10. Here, again, the reflector 21 may be the same as the reflectors 21 of the FIGURE 5 and FIGURE 1 embodiments. However, the square loops 34A, 35A, and 36A are mounted from four towers 62A, 62B, 62C and 62D with tower 62A performing the dual function of also being a coax feedline 40 carrying tower. Coax feedline 40 extends to coax line junction boxes 63A, 63B, and 63C mounted on tower 62A with line circuits 64A, 64B, and 64C connectnig the respective junction boxes to loop feed matching boxes 65A, 65B, and 65C, respectively. Here, again, structural sections of the towers are insulated by insulation sections 66 to provide the same insulation characteristics as provided by the insulators 46 in the antenna 32 embodiment of FIGURE 5. Insulators 50 provide the same sort of insulation in loop support cable structures as the insulators 50 do in providing electrical insulation in supporting cables of the FIGURE 5 embodiment. Many components of this embodiment are substantially the same as in other embodiments and those numbered the same perform in this embodiment substantially the same function as those illustrated and described with respect to other embodiments. It should be noted that guying cables in this embodiment and in other embodiments may be, relatively speaking, of a non-conductive plastic material such as the material known in the trade as Dacron. In this embodiment, just as with the substantially square loop 23 of the FIGURE 1 embodiment, feed loops 34A, 35A and 36A are all mounted with two of their opposite corners substantially along a vertical plane extension of a ground radial axis through the focal point. Further, the larger high frequency loop is supported at the greater height and the high frequency smaller loop at the lower height, and with the feed to the loops being supplied from the outermost tower 62A.

With relatively large size wavelengths as dealt with in various of the embodiments described, the azimuth beamwidth for vertically polarized paracylinders and also with respect to some of the horizontally polarized loop feed systems may become too narrow to receive ionospherically propagated waves which show a statistically distributed fluctuation in angle of arrival. For example, use of a parabolic reflector with a one thousand foot reflector aperture width measurement D results in about a 20 db directive gain at 3 mc. for the vertical monopole feed, and an azimuth bandwidth at 30 mc. of 2.5 degrees. This is an azimuth bandwidth too narrow to accommodate possible azimuth fluctuations, around a great circle path, of as much as ±5 degrees. This may be overcome, as shown in the paracylinder antenna 67 embodiment of FIGURE 11, by spacing both the vertical wire reflector elements 68 and the horizontal wire reflector elements 69 in the outermost portions 70 of the parabolic reflector 71 wide enough, as related to narrower spacing of their corresponding elements in the center main portion 72 of the reflector, so they reflect below about 8 mc. where the large effective paracylinder aperture D is needed. This spacing is such as to become increasingly transparent with increasingly higher frequencies above 8 mc. so that the total aperture D in terms of frequency wavelength and also the azimuth beamwidth stay about constant.

Another way, in the embodiment of FIGURE 11, of providing greater flexibility with respect to azimuth beam steering is to provide the three vertical monopoles 73, 74 and 75 and three feed loop 76, 77, and 78 systems. These three loop systems have effective operational center locations substantially coinciding with the effective operational location points of the respective three monopoles and with the center loop and monopole positioned on the focal line, and the other two loop and monopole combined systems displaced slightly to the left and to the right, respectively. This provides for a relatively small increase in beam steering flexibility amounting to about ±2 beamwidths without excessive increase in side lobes but it would be enough to cover the variations in azimuth angle due to such factors as ionospheric tilt. With respect to the horizontal polarization, beam steering is not particularly required in low bands up to approximately 10 mc., however, with the combination antenna loop feed systems, they may be employed to advantage from approximately 10 mc. up to higher frequencies. The loops are arranged as three overlapping loops with the corresponding frequency loops positioned at slightly different heights as shown in FIGURE 11. With this embodiment the loops are suspended from mounting towers 79 all mounted as, for example, on poured concrete foundations 80. The three monopoles, mounted on similar poured concrete foundations 81, would be fed by feedlines from the vicinity of the ground plane in a conventional manner just as would other monopoles of other embodiments, feed details not shown, and the loops would be fed by feedline extensions 82A, 82B, and 82C from the centermost aperture side tower 79.

Referring now to FIGURE 12, a paracylinder antenna 83 embodiment is shown that uses a combined vertically and horizontally polarized feed 84 located at a focal point with a distance and antenna configuration arranged to provide an operationally favorable $F/D$ ratio approximately equal to 0.16 substantially the same as is the case with the other embodiments set forth herein. This feed 84 utilizes a broadband vertical monopole 85 and horizontal dipole 86 with the horizontal dipole being made up of vertically spaced horizontally extending wires mounted on two outer mounting towers 87 and a center focal point tower 88 which is also the structural mounting center tower for the radiation structure of monopole 85. It should be noted that the horizontal dipole is formed by the location of mounting towers 87 and 88 into a V-shape so that the parabolic reflector 89 will be more uniformly illuminated in this antenna structure with this feed. Since the reflector has to reflect horizontally polarized waves over approximately 180 degrees of antenna aperture with directed feed patterns the outer portions 90 consist of simple vertical wire reflector elements in place of the rectangular grid reflector mesh used through the center portion 91 of the parabolic cylinder 89 between the outer portions 90. In this embodiment it should be noted that feed for the dipole may be provided from a feed tower 92, mounted feed box 93 to the rear of the antenna through feedlines 94 extended through the center portion 91 of the parabolic reflector 89 to a feed connection with the horizontal dipole 86.

Referring also to the paracylinder antenna 95 embodiment of FIGURES 13 and 14, the combination of a high band monopole 96 and a low band complementary dipole pair 97 are shown as the combined vertically and horizontally polarized feed 98 for illuminating reflector 99. Here, again, the horizontal complementary pair dipoles 97 are formed in a V-shape in order to provide that the reflector be more uniformly illuminated. The reflector is formed with outer end portions 100 having only vertical reflecting elements, a center portion 101 extending between the outer end portions 100 with a lower substantially half portion consisting of a reflective rectangular grid wire mesh 102 and with substantially the upper half 103 consisting of horizontal wire reflective elements. A feedline 104 is provided from the vicinity of the center portion 101 of reflector 99 to a hybrid circuit box 105 mounted on a mounting tower 88', similar to the tower 88 in the embodiment of FIGURE 12, from which feedline connections 106 and 107 are extended to center feed points of the dipole 108 and the folded dipole 109, respectively. In this embodiment feed element mounting towers 87' and 88' extend to a proportionately greater altitude than their corresponding tower elements 87 and 88 in the embodiment of FIGURE 12, particularly with the greater top height dimensional requirements imposed by the complementary pair element group dipole 108 and folded dipole 109. A coaxial feedline 110 is connected to feed from the bottom of monopole 96 in the region of the monople ground plane mounting.

In an antenna structure as set forth with the embodiment 95, of FIGURES 13 and 14, the reflector has to reflect horizontally polarized waves only over approximately 180 degrees of angular aperture. Thus, the remainder of the reflector at the outer ends, that is, end portions 100 of this embodiment, employ only simple vertical wire reflective elements instead of the rectangular grid used in the lower portion 102 of the center section 101 of the reflector. It should also be noted that, in the embodiment of FIGURE 12, with respect to the outer end portions 100 and the wire mesh portion 102 of the embodiment of FIGURE 13, that the reflector can be of reduced height of approximately 60 feet with greatly reduced structural and erection costs. Obviously, in the embodiment of FIGURES 13 and 14, the upper portion 103 is extended above this height. Referring again to the combined feed 98 of the embodiment of FIGURES 13 and 14, the maximum top height of the feed with the complementary dipole pair at the top is approximately 150 feet, while the height of the monopole 96 is approximately 22 feet for the reflector 99 shown with vertical polarization available from 10 to 30 mc. Referring back to the embodiment of FIGURE 12, a dual band monopole 85 may be used having a height of approximately 80 feet. With both of these embodiments both vertical and horizontal polarization are available over most of the HF range of the frequency spectrum since the dipole feeds can be used over more than a 4:1 frequency band range. The impedance match is good up to practically 30 mc., and even though the E-plane pattern undergoes deterioration as the higher frequency is approached, there still is a sufficient percentage of power illuminating the reflector in azimuth so that the total radiation pattern does not undergo very much change. The side lobes at about ±90 degrees undergo an increase for frequency above 15 mc. if the dipole length is 0.3λ at the lowest operating frequency, and the gain is reduced above approximately 12 mc. by destructive interference between the various lobes of the E-plane pattern. However, if the focal length is properly chosen, the interference between the feed and its image on axis can be optimized such that only the side lobes are illuminating the reflector. This results in an increase of useful frequency range with respect to total paracylinder gain particularly since at the higher frequencies employed the increased reflector gain tends to compensate for reduced illumination efficiency.

It should also be noted that various additional paracylinder antennas according to applicant's teachings could employ in their combined vertical and horizontally polarized feeds complementary pair vertically polarized feed monopoles fed through an interconnecting hybrid and other alternately used complementary pair structures providing vertically polarized feed. With such complementary pair element groups the complementary pair of radiating elements would be effectively located substantially at the focal point and possibly straddling, one element forward and one element behind, the focal point along a ground radial through the focal point of a paracylinder antenna.

Thus, it may be seen that this invention provides various combination vertically and horizontally polarized fed paracylinder antenna configurations particularly useful in the HF and, in some instances, also up into the VHF ranges with antenna feed arrays located effectively at relatively short focal distances F as determined by the respective paracylinder reflector shapes and with reflector aperture width D and with a relatively low $F/D$ ratio approximating 0.16. The invention provides for paracylinder antenna reflector heights generally falling in the range of from 0.4λ to 1λ with most being advantageously under a wavelength in height. Further, it provides for operation through various operational frequency ranges, particularly in the transmit mode of operation, for feed switching between the vertically polarized feed element array and the horizontally polarized feed antenna arrays, or for simultaneous feed to both, with the simultaneous feed condition being more generally utilized for the receive mode of operation with some of the various paracylinder antenna embodiments.

Whereas this invention is here illustrated and described with respect to specific embodiments thereof, it should be realized that various changes may be made without departing from the essential contribution to the art made by the teachings hereof.

I claim:

1. In the feed system for a paracylinder type antenna having a focusing reflector so shaped as to have a focal point line spaced a predetermined distance forward from the rear of the center portion of the reflector, and having two end portions defining antenna reflector aperture width: first radiator means oriented for vertically polarized electromagnetic radiation; second radiator means oriented for horizontally polarized electromagnetic radiation; with both said first and second radiator means being so positioned that their effective operational center locations are substantially on the focal point line of the reflector; wherein the antenna reflector is mounted on and extends vertically above a ground plane; with both the first radiator means of the feed system and the second radiator means of the feed system mounted above said ground plane; with said second feed system radiator means being mounted at higher elevation above said ground plane than said first feed system radiator means; wherein said second feed system radiator means is loop feed means; and wherein said loop feed means is a plurality of feed loops of various sizes with the larger lower frequency range loop being mounted at a higher elevation above the ground plane than a lower frequency smaller loop, and with all loops of the second radiator means being mounted in like orientation height-wise larger at higher height to smaller progressively at lower heights.

2. The antenna and antenna feed system of claim 1, wherein said loops of the second feed system radiator means are substantially square loops of conductive wire approximately half an operational center frequency wavelength for each respective operational bandwidth, in length around the respective loops; and with the loops substantially parallel to the ground plane.

3. The antenna and antenna feed system of claim 2, wherein said loops are mounted with two opposite sides of each substantially perpendicular to a ground radial through the focal point line.

4. The antenna and antenna feed system of claim 2, wherein said loops are mounted with two opposite corners substantially on a ground radial through the focal point line.

5. The antenna and antenna feed system of claim 2, wherein at least one of said loops is mounted with two opposite sides substantially perpendicular to a ground radial through the focal point; and at least one of said loops is mounted with two opposite corners substantially on the ground radial through the focal point line.

6. The antenna and antenna feed system of claim 1 wherein the reflector is a parabolic arc reflector built up of reflective elements; with the two end portions being opposite end substantially rectangular extensions of the reflector with increased spacing between reflective elements of the parabolic reflector than the spacing in the reflector between the opposite end extensions; and wherein only vertical reflective elements are used in the opposite end extensions; and the spacing between reflective elements is increased in the opposite end extensions with increasing distance to each side of the center of the parabolic arc.

7. The antenna and antenna feed systems of claim 6, wherein, through a center portion of the parabolic arc reflector, a vertically extended reflector section of horizontal reflective elements is provided.

References Cited

UNITED STATES PATENTS

| | | | |
|---|---|---|---|
| 2,149,333 | 3/1939 | Brown | 343—816 X |
| 3,178,713 | 4/1965 | Yang | 343—912 X |
| 2,508,657 | 5/1950 | Toller-Bond | 343—874 |
| 2,551,586 | 5/1951 | Dobler et al. | 343—836 |
| 2,648,003 | 8/1953 | Chu | 343—835 X |
| 2,751,590 | 6/1956 | Troutman | 343—732 X |
| 2,982,961 | 5/1961 | Jones | 343—840 |
| 2,990,544 | 6/1961 | La Rosa | 343—840 X |
| 2,995,752 | 8/1961 | Shyhalla et al. | 343—726 X |
| 748,597 | 1/1904 | De Forest | 343—837 X |
| 1,556,137 | 10/1925 | Weagant | 343—729 X |
| 1,805,591 | 5/1931 | Ohl | 343—840 X |
| 1,892,221 | 12/1932 | Runge | 343—726 X |
| 1,965,184 | 7/1934 | Gothe | 343—728 X |
| 2,049,070 | 7/1936 | Mathieu | 343—840 X |
| 2,054,896 | 9/1936 | Dallenbach | 343—837 |
| 2,156,653 | 5/1939 | Ilberg | 343—839 X |
| 2,244,628 | 6/1941 | Kotowski | 343—733 |
| 2,256,619 | 9/1941 | Luck | 343—726 |
| 2,421,988 | 6/1947 | Brown et al. | 343—840 X |

FOREIGN PATENTS 402,834   12/1933   Great Britain.

OTHER REFERENCES

Schroeder, Klaus G.; "The Paracylinder: A High Gain Broadband Hardenable Antenna," Microwave Journal, October 1944, pp. 74–77.

HERMAN KARL SAALBACH, Primary Examiner

WM. H. PUNTER, Assistant Examiner

U.S. Cl. X.R.
343—835, 840, 912